Patented Dec. 6, 1938

2,139,372

UNITED STATES PATENT OFFICE 2,139,372

PRODUCTION OF CRESOLS AND HIGHER PHENOLS BY FUSION

Joseph R. Mares, St. Louis, Mo., assignor to Monsanto Chemical Company, St. Louis, Mo., a corporation of Delaware No Drawing. Application June 11, 1937, Serial No. 147,643

9 Claims. (Cl. 260—154)

The present invention relates to the production of cresols and alkyl-substituted phenols of the benzene series from aromatic hydrocarbons by sulfonation of the corresponding hydrocarbon and fusion of the resulting sulfonic acid with sodium hydroxide.

Methods for the production of phenol from benzene by means of sulfonation and caustic soda fusion have been in industrial use for a long period. These industrial methods are so well known as to make further description unnecessary. The only caustic alkali which makes such processes practical and economical is caustic soda or sodium hydroxide. Potassium hydroxide, although conceded by many authorities to be a better alkali for the purpose, is far too expensive and difficult to obtain and is not used in industry.

To produce para-cresol it would appear that it would be necessary merely to substitute para-toluenesulfonic acid for benzene sulfonic acid in the phenol process. Yet when this substitution is made, a caustic soda fusion is unsatisfactory. In processes heretofore utilizing alkaline fusion of para-toluenesulfonic acid for the production of para-cresol, potassium hydroxide or a mixture of sodium and potassium hydroxides has been required. In the notes in "Organic Syntheses" (collective Volume I, Henry Gilman, editor-in-chief, New York, John Wiley and Sons, Inc., 1932, page 169) accompanying such a procedure, wherein a mixture of sodium and potassium hydroxides is specified, it is stated:

"Fusion with sodium hydroxide alone yields no cresol, the fused sodium hydroxide appearing to have no solvent action on the sodium p-toluenesulfonate. On the other hand, potassium hydroxide works entirely, satisfactorily, as do mixtures of sodium hydroxide and potassium hydroxide containing not less than 28 per cent of potassium hydroxide."

The requirement of potassium hydroxide seriously limits this process for the production of para-cresol. There may be some question as to whether the controlling phenomenon is essentially one of solubility, but nevertheless, the fact remains that when sodium para-toluenesulfonate is fused with sodium hydroxide, under conditions comparable with those used in the benzenesulfonate fusion, no reaction is evident until finally and suddenly the reaction is initiated with such explosive violence as to make the reaction impractical to operate. Notwithstanding, it has not been possible heretofore to obtain good yields of para-cresol from a sodium hydroxide fusion.

It is an object of the present invention to provide a practical and economical method for the production of para-cresol and alkyl-substituted phenols of the benzene series by fusion of the corresponding sulfonic acids with sodium hydroxide under conditions such that a smooth reaction results and the yields are good. An object of the invention, therefore, is to provide a method of dispensing with the more costly potassium hydroxide which has heretofore been required in such processes.

I have discovered that the above desired object is realized when the fusion mixture consisting of sodium hydroxide and the sodium salt of para-toluenesulfonic acid or other alkyl-substituted aromatic sulfonic acid contains in addition a sodium salt of a phenol or an aromatic sulfonic acid other than that corresponding to the desired phenol, for example, sodium benzenesulfonate or sodium isopropylbenzenesulfonate. In this manner the heretofore unusually difficult fusion reaction progresses smoothly in much the same manner as that of the industrial phenol fusion process. The yields, on the other hand, approximate closely those corresponding to theoretical conversion.

The method or mechanism by virtue of which these added moderating substances act is not clearly understood but they apparently have a solvent or fluxing action on the fusion mixture and probably also have a catalytic effect on the reaction.

The invention will be further described as applied specifically to preferred methods for the production of para-cresol from para-toluenesulfonic acid. However, it is obvious that the process is capable of general application to the production of other phenols, whose corresponding aromatic sulfonic acids do not lend themselves readily to smooth reaction and that such aromatic sulfonic acids can be treated similarly according to the methods described.

Example 1

A quantity of caustic soda is placed in a fusion kettle and the temperature of the kettle is brought up to about 300° C., at which temperature the batch is maintained by heating. Water may be added in the usual manner at the start to facilitate the fusion. A solution of sodium benzenesulfonate and sodium para-toluenesulfonate is then pumped, in a regulated manner, under the surface of the caustic melt, which is maintained in agitation by means of paddles, preferably paddles provided with scraper blades.

The water present will distill or flash off. A solution of approximately equimolecular quantities of the sodium benzenesulfonate and sodium toluenesulfonate is used and sufficient of this solution is added to leave finally in the fusion melt a quantity corresponding to 1 molecular proportion of sulfonates to 2.4 molecular proportions of sodium hydroxide.

The heating of the fusion kettle is regulated so that a temperature of about 300° C. or more is maintained during the addition of the sulfonate solution and is thereafter maintained at about 320° to 350° C. for several hours, the exact time depending upon the temperature which is maintained. As is well known, the higher the temperature, the shorter is the period of heating; it is general practice also to raise the temperature 10° or more at the end of the heating period, just before completing the fusion. The temperatures and periods of heating vary slightly with the different phenols but in general correspond rather closely with those used in phenol and beta-naphthol production.

From the fusion mass the phenols are recovered in the manner usual in phenol manufacture, using sulfur dioxide or carbon dioxide to liberate the phenols. The product in this instance is a mixture of phenol and para-cresol, which can be separated and purified most conveniently by distillation or by resorting to other physical and chemical methods of separation.

In the above procedure, the solution of sodium salts of benzenesulfonic and toluenesulfonic acids may be pumped in separate streams into the fusion mass. This method of operation is desirable since it permits of easier control of the proportions of the two sulfonates added to the mixture.

*Example 2*

The procedure described in Example 1 is repeated but less sodium benzenesulfonate is used, for example, a molecular ratio of sodium benzenesulfonate to toluenesulfonate is maintained at 1 to 4.

It is possible to vary the ratio of benzenesulfonate to toluenesulfonate in the reaction mixture over a wide range without great diminution of the yield.

*Example 3*

The procedure of Example 1 is repeated but instead of adding sodium benzenesulfonate to the fused sodium hydroxide, it is replaced by the sodium salt of phenol in equimolecular amounts. Phenol may be added instead of sodium phenate to the fused sodium hydroxide but the additions must be made in such a manner that it does not flash or distill immediately before it has reacted to form the sodium salt.

*Example 4*

The procedure of Example 1 is repeated but the sodium salt of para-cresol is added in equimolecular amounts in lieu of sodium benzenesulfonate.

In this method the product consists of only the desired para-cresol without substantial proportions of any other phenol.

The ratio of the sodium hydroxide to sulfonates used in the process is not critical. The theoretical quantity is 2 mols to each mol of sulfonate but slightly more than this is necessary in practice, as indicated in the examples above. In this regard it is to be noted that without the use of the invention, sodium toluenesulfonate fused with a large excess of sodium hydroxide alone will not yield para-cresol to any extent but when sodium benzenesulfonate is added the yield is greatly increased even with only a small excess of sodium hydroxide present. In practice, the greater the ratio of benzenesulfonate to toluenesulfonate in the fusion the smaller is the proportion of sodium hydroxide which is required to produce a good yield of phenols. Agitation is also a factor in this process, better yields resulting when the agitation or stirring is conducted at a rapid rate than under the same conditions with slow stirring.

Instead of sodium benzenesulfonate or phenols specified in the examples above, various other materials can be used. The sodium salts of other aromatic sulfonic acids and phenols work practically equally as well including the sodium salts of isopropylphenol, para-tertiary-amylphenol and other cresols. In the production of different phenols by the process the choice of phenol or aromatic sulfonic acid salt to use as the moderating or catalytic agent will be dependent also upon the desirability of the by-products resulting. In the production of para-cresol a desirable by-product phenol is phenol itself and hence sodium benzenesulfonate or sodium phenate is preferred for this purpose. By the use of the sodium salt of para-cresol by-product phenols of another kind can be avoided. However, it is to be observed that although two different phenols are produced when the sodium salt of another aromatic sulfonic acid is used as a moderating agent, both sulfonic acids are converted to phenols and thus greater economic advantages flow from this method of operation than from the use of a phenol salt as a moderating agent.

In lieu of operating according to the methods specified in the examples, the process can be conducted as exemplified in the following method of producing para-cresol:

Sodium benzenesulfonate and sodium hydroxide are fused together according to the usual process for the production of phenol. An excess of sodium hydroxide may be used in this preliminary fusion or sufficient sodium hydroxide may be added after the preliminary fusion. Sodium para-toluenesulfonate is then added and the mass is fused further to complete the conversion to para-cresol. The proportion of toluenesulfonate which is added will be dependent, of course, upon the proportion of sodium hydroxide which is present during the fusion. As another alternative, to a residue of sodium phenate resulting from a phenol fusion is added sodium hydroxide. After melting this mass, sodium toluenesulfonate is added and the fusion is continued until the toluenesulfonate is converted to para-cresol.

Inasmuch as the specification comprises preferred embodiments of the invention it is to be understood that it is not limited specifically thereto and that changes and modifications can be made in the conditions described without departing substantially from the invention, which is defined in the appended claims.

What I claim is:

1. In a process of producing an alkyl-substituted phenol of the benzene series by fusion of the corresponding sodium salt of the aromatic sulfonic acid with sodium hydroxide, the improvement by which good yields and smooth reacting conditions are obtained, characterized in that the mixture undergoing fusion contains, in addition to the sodium aromatic sulfonate and sodium hydroxide, a compound selected from the group consisting of sodium phenates and sodium aromatic sulfonates other than that being fused to form the desired phenol of the process.

2. In the process of producing para-cresol by fusion of sodium para-toluenesulfonate with sodium hydroxide, the improvement by which good yields and smooth reacting conditions are obtained, characterized in that the mixture undergoing fusion contains, in addition to the sodium para-toluenesulfonate and sodium hydroxide, a substance selected from the group consisting of sodium phenates and sodium aromatic sulfonates other than sodium para-toluenesulfonate.

3. The process as defined in claim 2, and further characterized in that the mixture undergoing fusion contains sodium benzenesulfonate in addition to sodium para-toluenesulfonate and sodium hydroxide.

4. The process as defined in claim 2, and further characterized in that the mixture undergoing fusion contains sodium phenate in addition to sodium para-toluenesulfonate and sodium hydroxide.

5. The process as defined in claim 2, and further characterized in that the mixture undergoing fusion contains the sodium salt of para-cresol in addition to sodium para-toluenesulfonate and sodium hydroxide.

6. The process as defined in claim 1 and further characterized in that the mixture undergoing fusion contains in addition to the sodium aromatic sulfonate and sodium hydroxide, a compound selected from the group consisting of sodium phenates and sodium aromatic sulfonates other than that being fused to form the desired phenol of the process, said compound being present in a proportion of at least 1 mol to each 4 mols of the sodium aromatic sulfonate.

7. The process as defined in claim 2 and further characterized in that the mixture undergoing fusion contains, in addition to the sodium para-toluenesulfonate and sodium hydroxide, a substance selected from the group consisting of sodium phenates and sodium aromatic sulfonates other than sodium para-toluenesulfonate, in a proportion of at least 1 mol to each 4 mols of sodium para-toluenesulfonate.

8. In the process of producing para-cresol by fusion of sodium para-toluenesulfonate with sodium hydroxide, the improvement by which good yields and smooth reacting conditions are obtained, characterized in that the mixture undergoing fusion contains in addition at least 1 mol of the sodium salt of para-cresol to each 4 mols of sodium para-toluenesulfonate.

9. In the process of producing para-cresol by fusion of sodium para-toluenesulfonate with sodium hydroxide, the improvement by which good yields and smooth reacting conditions are obtained, characterized in that the mixture undergoing fusion contains, in addition to the sodium para-toluenesulfonate and sodium hydroxide, sodium benzenesulfonate.

JOSEPH R. MARES.